United States Patent
Matsumoto et al.

(10) Patent No.: US 6,376,431 B1
(45) Date of Patent: Apr. 23, 2002

(54) REDUCED WEAR CARBON BRAKE MATERIAL

(75) Inventors: Roger L. K. Matsumoto, Newark, DE (US); George D. Forsythe, Landenberg, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/808,810

(22) Filed: Mar. 15, 2001

(51) Int. Cl.$^7$ .......................... C10M 103/00; B32B 9/00
(52) U.S. Cl. ....................... 508/107; 428/367; 428/408; 428/446; 428/698; 427/228
(58) Field of Search .................... 508/107; 428/408, 428/446, 698, 367; 427/228

(56) References Cited

U.S. PATENT DOCUMENTS

| | | |
|---|---|---|
| 3,897,582 A | 7/1975 | Olcott |
| 3,991,248 A | 11/1976 | Bauer |
| 4,041,116 A | 8/1977 | Baud et al. |
| 4,766,013 A | 8/1988 | Warren |
| 4,815,572 A | 3/1989 | Froberg et al. |
| 4,944,373 A | 7/1990 | Ohya et al. |
| 5,009,823 A | 4/1991 | Kromrey |
| 5,358,739 A | 10/1994 | Baney et al. |
| 5,380,556 A * | 1/1995 | Hocquellet .................. 427/228 |
| 5,459,114 A | 10/1995 | Kaya et al. |
| 5,462,800 A | 10/1995 | Yamazaki et al. |
| 5,665,848 A | 9/1997 | Barnard et al. |
| 5,837,364 A * | 11/1998 | Zank .......................... 428/446 |
| 6,077,605 A | 6/2000 | McGowan et al. |
| 6,077,607 A * | 6/2000 | Zornik ....................... 428/408 |

OTHER PUBLICATIONS

"Synthesis of methyltriethoxysilane (MTEOS) derived SiC incoporated carbon–carbon composites", S. R. Dhakate, V. Raman, T. L. Dhami, O. P. Bahl; *Journal of Materials Science Letters* 20.2001.311–813, pub. May 1, 2001.

* cited by examiner

*Primary Examiner*—Jacqueline V. Howard
(74) *Attorney, Agent, or Firm*—Larry J. Palguta

(57) ABSTRACT

A carbon/carbon (C/C) composite comprising crystalline silicon carbide which is essentially uniformly distributed on both internal and external surfaces of the composite in a low concentration, as well as a process for producing the composite and the use of the composite in brake materials for industrial roll goods, automotives, trucks, trains and aircrafts. It has been discovered that small amounts of crystalline silicon carbide uniformly distributed throughout the carbon/carbon composite results in reduced wear with either no change or a slight increase in the friction coefficient.

20 Claims, No Drawings

REDUCED WEAR CARBON BRAKE MATERIAL

TECHNICAL FIELD OF THE INVENTION

The present invention includes a carbon/carbon (C/C) composite comprising crystalline silicon carbide which is essentially uniformly distributed on both the internal and external surfaces of the composite, wherein the amount of silicon carbide is in a range of 0.001 to 1.00 weight percent based upon the total weight of the composite, a process for producing said composite and the use of said composite in brake materials for industrial roll goods, automotives, trucks, trains and aircrafts.

BACKGROUND OF THE INVENTION

The art has recognized the advantages of frictional braking elements, such as brake discs, made of carbon. In more advanced production techniques, the carbon materials are made by molding a mixture of carbon fibers and an organic polymer, and pyrolyzing the polymer binder. The carbon materials have the advantage of a high temperature resistance coupled with a low density, which substantially reduces the dead load making them particularly useful for vehicles such as aircrafts.

Yamazaki et al. (U.S. Pat. No. 5,462,800) teach the formation of a silicon carbide layer in a carbon matrix/carbon fiber composite material by introducing SiO (silicon-mono-oxide) gas at the surface of a C/C composite thereby reacting the SiO with the pyrolytic graphite (and in part the carbon fibers) and forming the silicon carbide layer. According to Yamazaki et al., the silicon carbide is formed to a depth of 3000 $\mu$m, and as such, the SiC is essentially present on the external surface of the composite only.

Barnard et al. U.S. Pat. No. 5,665,848, teach a composite comprising carbon containing fibers in a matrix of silicon carbide. An assembly of carbon fibers are impregnated with a organopolysilazane/crosslinker/promoter preceramic mixture to form a "pre-preg". The pre-preg is then exposed to a series of heating steps to form the final ceramic composite. The final ceramic composite contains a matrix of a char which is noncrystalline.

Kaya et al. U.S. Pat. No. 5,459,114 teach a process for producing a ceramic comprising repeating a step of impregnating a metal fiber or ceramic fiber preform with a mixture of organopolysilazane-type polymers. Optionally, the surface of the metal or ceramic fiber containing woven fabric, can be covered with carbon before impregnating with the organopolysilazane. In addition, Kaya et al. teach a step of chemical vapor deposition of a heat resistant ceramic either before or after the organopolysilazane impregnation step. The final composite contains a noncrystalline matrix of the organopolysilazane char.

The large amounts of silicon carbide created in these patents would result in high friction coefficients and high wear rates. None of the above-described patents address the process of coating a porous preform or final body with a small amount (less than 1 wt %) of thin crystalline silicon carbide distributed throughout the part, i.e., on both the internal and external surfaces to reduce the wear rates with either no change or a slight increase in the friction coefficients.

SUMMARY OF THE INVENTION

The present inventors have found that small amounts of crystalline silicon carbide uniformly distributed throughout the part results in reduced wear with either no change or a slight increase in the friction coefficient. Also, the properties of this material remain constant during use even after wear of the outer surface.

The present invention includes a C/C composite comprising crystalline silicon carbide which is essentially uniformly distributed on both the internal and external surfaces of the composite, wherein the amount of silicon carbide is in a concentration range of 0.001 to 1.00 weight percent based upon the total weight of the composite, a process for producing said composite and the use of said composite in brake materials for industrial roll goods, automotives, trucks, trains and aircrafts.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The present invention, in part, relates to a C/C composite comprising crystalline silicon carbide which is essentially uniformly distributed on both the internal and external surfaces of the composite, wherein the silicon carbide is in a concentration range of 0.001 to 1.00 weight percent based upon the total weight of the composite. Preferably, the concentration range of the silicon carbide is 0.01 to 0.5 weight percent.

The present invention, in part, relates to a C/C composite containing silicon carbide, wherein the composite has a wear rate in the range of 0.01 to 0.13 inch/s/s$\times 10^{-4}$, and a friction coefficient in the range of 0.27 to 0.4. Preferably, the wear rate is in the range of 0.03 to 0.12 inch/s/s$\times 10^{-4}$, and the friction coefficient is in the range of 0.28 to 0.395.

The present invention, in part, relates to a C/C composite, wherein the SiC in the composite is at least 60 wt % crystalline, preferably at least 90 wt % crystalline, and most preferably about 100 wt % crystalline.

The present invention, in part, relates to a process for preparing a C/C composite comprising crystalline silicon carbide which is essentially uniformly distributed on both the internal and external surfaces of the composite, said process comprising: contacting a C/C composite preform with a solution of a preceramic compound composed of silicon and carbon; and heating the C/C composite to a temperature sufficient to convert the preceramic compound to silicon carbide; wherein the amount of silicon carbide is in a range of 0.001 to 1.0 weight percent based on the weight of the total composite (in the dried state).

The preceramic compound can be either a polymer or a small molecule and is not specifically limited, but is required to form silicon carbide upon heat treatment. The type of preceramic polymer is not specifically limited, but it is required to have silicon-carbon bonds and the amount of silicon in it should not be so high as to produce an excess of silicon, since excess silicon will attack the carbon fibers. The ratio of silicon to carbon can be controlled by adding a carbon containing crosslinking agent. The type of preceramic small molecule is preferably an alkyl orthosilicate such as tetraethyl orthosilicate (TEOS).

It is preferred that the preceramic polymer composed of silicon and carbon is polycarbosilane, organopolysilazane, polycarbosiloxane, or mixtures thereof.

The organopolysilazanes (or silazane polymers) useful in this invention are generally well known in the art. The organopolysilazanes of this invention generally contain units of the type [$R_2SiNH$], [$RSi(NH)_{1.5}$] and/or [$R_3Si(NH)_{1/2}$] wherein each R is independently selected from the group consisting of hydrogen, alkyl radicals containing 1 to 20 carbon atoms, aryl radicals, and alkenyl radicals. Naturally, the organopolysilazanes useful in this invention may contain other silazane units. Examples of such units include [$MeSi(NH)_{1.5}$], [$Me_2SiNH$], [$ViSi(NH)_{1.5}$], [$Vi_2SiNH$], [PhMeSiNH], [PhViSiNH], [MeViSiNH], [$HSi(NH)_{1.5}$], [$H_2SiNH$], and the like. Mixtures of organopolysilazanes may also be employed in the practice of this invention.

The organopolysilazanes of this invention and their method of preparation can be prepared by techniques well known in the art. Suitable preceramic silazane polymers or organopolysilazanes may be prepared by the methods of Cannady in U.S. Pat. No. 4,540,803 (issued Sep. 10, 1985) and U.S. Pat. No. 4,543,344 (issued Sep. 24, 1985) which are hereby incorporated by reference. Other organopolysilazanes suitable for use in this invention can be prepared by the methods of Gaul in U.S. Pat. No. 4,312,970 (issued Jan. 26, 1982), U.S. Pat. No. 4,340,619 (issued Jul. 20,1982), U.S. Pat. No. 4,395,460 (issued Jul. 26, 1983), and U.S. Pat. No. 4,404,153 (issued Sep. 13, 1983), all of which are hereby incorporated in their entireties by reference. Suitable organopolysilazanes also include those prepare by the methods of Haluska in U.S. Pat. No. 4,482,689 (issued Nov. 13, 1984) and Seyferth et al. in U.S. Pat. No. 4,397,828 (issued Aug. 9, 1983), both of which are hereby incorporated in their entireties by reference. Still other organopolysilazanes include those of Gerdau et al. in European Patent 351,747, those of U.S. Pat. No. 4,543,344, those of European Patent 332,374, those of Lebrun et al. in U.S. Pat. Nos. 4,656,300 and 4,689,252, the disclosures of which are all hereby incorporated in their entireties by reference.

The polycarbosilanes useful in this invention are generally well known in the art. Preferred polycarbosilanes are disclosed in Schilling et al. U.S. Pat. No. 4,414,403, Burns et al. U.S. Pat. No. 4,761,458 and Sartori et al. U.S. Pat. No. 5,087,685, each of which is incorporated by reference in its entirety.

The polycarbosiloxanes useful in this invention are generally well known in the art. Preferred polycarbosiloxanes are disclosed in Yajima et al. U.S. Pat. No. 4,289,720, and Onodera et al. U.S. Pat. No. 6,147,243, each of which is incorporated by reference in its entirety.

The method of crosslinking the preceramic polymer is not particularly limited and depends on the type of polymer. Some polymers can be crosslinked using only heat and optionally a crosslinking promoter (curing agent). For example, a polymer such as poly(methyl-vinyl)silazane can be crosslinked using dicumyl peroxide as the crosslinking promoter.

Crosslinking promoters which are useful in the present invention are well known in the art. Examples include organic peroxides such as dibenzoyl peroxide, bis-p-chlorobenzoyl peroxide, bis-2,-dichlorobenzoyl peroxide, di-t-butyl peroxide, dicumyl peroxide, t-butyl perbenzoate, 2,5-bis(t-butylperoxy)-2,3-dimethylhexane and t-butyl peracetate.

The crosslinking promoter is present in an effective amount, i.e. an amount sufficient to induce crosslinking in the polymer. Therefore, the actual amount of the crosslinking promoter will depend on the activity of the promoter used and the amount of polymer present. Normally however, the peroxide curing promoter will be present at about 0.1 to 5.0 weight percent based on the weight of the compound to be cured with the preferred amount being about 2.0 weight percent.

The solvent may include any which acts as a solvent for the preceramic polymer, and if present, the crosslinking agent and promoter and which do not cause rearrangement of these species. Examples of such solvents include alkanes such as pentane, hexane, octane etc.; halogenated alkanes such as methylene chloride, chloroform, methylene bromide, etc.; ethers such as tetrahydrofuran; aromatic hydrocarbons such as benzene, toluene, xylene etc.; alcohols such as methanol, ethanol, ethylene glycol, etc.; and ketones such as acetone, methyl ethyl ketone, etc. The concentration of the preceramic polymer in the solution is preferably 0.05–10 wt %. More preferably, the preceramic polymer in the solution is 0.1–5 wt %.

The present invention, in part, relates to a process for preparing a C/C composite comprising a layer of essentially uniformly distributed silicon carbide, wherein said C/C composite has a 0.005 to 1.0 percent weight gain after solvent removal. Preferably the C/C composite has a 0.01 to 0.3 percent weight gain after solvent removal.

The preceramic polymers will have different curing (crosslinking) mechanisms, depending upon their structure. Most preferred is the use of poly(methylvinyl)silazane which crosslinks via a free radical mechanism acting on the vinyl groups. The free radical is generated by the decomposition of an organic peroxide, such as dicumyl peroxide.

The temperature of the crosslinking step varies depending upon the type of preceramic polymer and the crosslinking promoter that are used. Preferably, the temperature is in the range of 50 to 200° C.

The pyrolysis step, wherein the preceramic polymer is converted to silicon carbide, is performed by heating the part to at least 1500° C., preferably the part is heated to 1600° C. If the part contains reactive carbon, then the pyrolysis step is performed in an inert atmosphere, such as argon or nitrogen.

The present invention, in part, relates to a process for preparing a C/C composite comprising a layer of essentially uniformly distributed silicon carbide, wherein the density of the C/C composite effectively remains constant even after the silicon carbide has been added.

The term "preform" as used herein, is defined as a carbon composite prepared by combining carbon fibers with an organic polymer, pyrolizing the mixture, and optionally densifying the composite by depositing carbon through chemical vapor deposition (CVD or CVI). This preform is a porous material having open voids. The amount of void space can be reduced by: (1) adding further organic polymer and pyrolizing the mixture; (2) further chemical vapor deposition of carbon; or (3) repeating steps (1) and/or (2) at least one time.

The preceramic polymers can be added to the C/C composite at the preform stage or can be added after the void space of the C/C composite has been reduced by any of steps (1) to (3) as described in the previous paragraph. It should be noted that when the preceramic polymer is added after any of steps (1) to (3), the C/C composite contains active carbon. The presence of active carbon requires that the pyrolysis step of the preceramic polymer is performed in an inert atmosphere (such as argon or nitrogen) in order to prevent the formation of carbon oxides due to the reaction between oxygen and the active carbon.

When the preceramic polymers are added to the C/C composite at the preform stage a crosslinking agent is used to increase the concentration of carbon in the composite and to reduce the likelihood that reactive silicon atoms on the preceramic polymer will react directly with the fibers of the composite. The crosslinking agent and the preceramic polymer may be blended in nearly any ratio desired to provide sufficient flow and final cure. Generally, however, the crosslinking agent is present in an amount of at least about 0.01 wt % crosslinking agent based on the weight of the preceramic polymer with a range of about 0.01 to about 50 wt % being preferred. The type of crosslinking agent can be any compound that reacts with the preceramic polymer. It is preferred to use a diisocyanate such as 1,6-diisocyanatohexane.

When the preceramic compound is an alkyl orthosilicate, the process of forming the silicon carbide on the inner and outer surfaces of the composite is different in some respects from the process using a preceramic polymer due to the nature of the alkyl orthosilicate. The alkyl orthosilicate is first dissolved in a solvent, which is typically an alcohol solvent such as ethanol. Then a concentrated strong acid (such as HCl, $HClO_4$, $H_2SO_4$, perfluoroacetic acid, phosphoric acid, etc.) is added to begin the precipitation reaction. Since the precipitation reaction begins before the solution is added to the preform, the timing of the initiation of the precipitation is important. If the precipitation reaction is allowed to proceed too long before adding to the preform, the precipitate particles will become too large to enter the small pores of the preform. Thus, it is preferred to begin the precipitation reaction immediately prior to infiltrating the solution into the preform. Once the solution is added to the preform, the preform is allowed to sit in the solution until the precipitation reaction is essentially complete, typically 24 hours. The infiltrated part is removed from the solution and the solvent is removed. Then the silicon carbide is formed in a pyrolysis step which is optionally coincidental with the step of subjecting the part to carbon CVD to increase the density.

An aspect of this invention is that the silicon carbide is formed on both the internal and external surfaces of the C/C composite. This is advantageous when the friction, resulting from the use of this material in brakes, begins to wear the surface of the composite material. By having the silicon carbide not merely on the outer surface, the overall mechanical properties do not decrease, e.g., the wear rates remain essentially constant even when the outer surface of the brake has been worn away.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

EXAMPLES

The C/C composites prepared in the following Examples were tested for effectiveness and wear rates using a Research Dynamometer Model TE-1 352. The inertia was set at 0.1323 slug-ft². The brake-on speed was 6400 RPM and the brake applied force was 500 lbs. The recycle temperature was 140° C., and the part was cooled for 300±30 seconds between stops.

The effectiveness is equivalent to the coefficient of friction ( ), which is measured using the following formula:

$$= \frac{2.399}{t} \text{ where } t = \text{stop time in seconds.}$$

The wear rate is measured by thickness loss for 100 stops in inch/surface/stop (in/s/s).

Undoped brakes typically have a wear rate of 0.14 in/s/s×$10^{-4}$ and an effectiveness of 0.285–0.350.

Example #1

A non-woven preform (CARBENIX® 4000 series brand of non-woven preform, by Honeywell Aircraft Landing Systems, Inc.) was infiltrated with a solution of 1% CERASET® preceramic polymer (poly(methylvinyl) silazane) (Honeywell Advanced Composites, Inc.) and 2% of 1,6-diisocyanatohexane in heptane. The part was dried at room temperature to remove the solvent. The preform had 40 vol % porosity at this stage in its processing. There was a 0.197% weight gain to the part after solvent removal. The part was cured by heating to 150° C. for 1 hour. Pyrolysis of the CERASET® preceramic polymer to silicon carbide was performed by heating to 1600° C. in argon. With completion of conversion, the preform was densified using standard CVD methodology. The amount of SiC in the part was 0.029 wt % based on the total weight of the part.

The performance results showed the brake to have a wear rate of 0.07 in/s/s×$10^{-4}$. Compared to undoped brakes with a typical wear rate of 0.1 4 in/s/s×$10^{-4}$, this is a two fold improvement. The doped brake had an effectiveness (friction coefficient) of 0.389, which is also an improvement when compared to undoped brakes which typically have an effectiveness of 0.285–0.350.

Example #2

A non-woven preform (CARBENIX® 4000 series) was treated in the same manner as in Example 1, except that the solution was 5% CERASET® in heptane. The part had a weight gain of 1.51% after solvent removal. The amount of SiC in the part was 0.222 wt % based on the total weight of the part.

This material showed a wear rate of 0.11 in/s/s×$10^{-4}$, and an effectiveness (friction coefficient) of 0.311.

Example #3

A CARBENIX® 4000 series carbon-carbon brake that had been through all CVD processing was treated in the following manner:

A solution of 0.5% by weight CERASET and 1% dicumyl peroxide as a cure initiator in heptane was prepared. The densified brake material was submerged in the solution for 5 minutes. After removal from the solution, the part was dried at room temperature to remove heptane.

The silazane was converted to SiC in the final carbonization step. The amount of SiC in the part was 0.005 wt % based on the total weight of the part.

Three test parts were made from the brake material and tested for wear. The results were: effectiveness –0.30, 0.30 and 0.28 and wear rate (in/s/s×$10^{-4}$)–0.040, 0.100 and 0.090, respectively.

Example #4

This example incorporates the use of the reagent TEOS as the source of silica to make the SiC layer.

A non-woven preform (CARBENIX 4000 series brand of non-woven preform by Honeywell Aircraft Landing Systems) was infiltrated with a mixture prepared as follows: 52.5 g TEOS is rapidly mixed into 250 ml ethanol, then 30 ml concentrated HCl is then stirred in. Once this mixture is infiltrated into the preform, all is covered and allowed to stand for 24 hours. The infiltrated part is removed from the mixture and allowed to dry for 24 hours, then heated to 75° C. for 3 hours. This part was then subjected to carbon CVD to full density. The amount of SiC in the part was 0.708 wt % based on the total weight of the part.

The finished part was machined into three pieces that were tested as in Example #1. The measured wear rates were 0.088, 0.113 and 0.167 in/s/s×$10^{-4}$, with corresponding effectiveness of 0.327, 0.312 and 0.247. This example shows that it is possible to have a measured wear rate less than the unmodified material.

Comparative Example #1

This comparative example shows the deleterious effects of increasing the amount of silicon carbide in the C/C composite to be above 1.0 wt %.

A non-woven preform (CARBENIX 4000 series brand of non-woven preform by Honeywell Aircraft Landing Systems, Inc.) was soaked in neat Ceraset-SN and 1% dicumyl peroxide as the crosslinking promoter and 2% 1,6-diisocyanatohexane as the crosslinking agent. After soaking for 20 minutes at room temperature, the preform was removed from the liquid and allowed to drain. The part was cured and pyrolyzed in a manner similar to Example #1. The amount of SiC in the part was 12.0 wt % based on the total weight of the part.

The part had an effectiveness of 0.435 and a wear rate of 0.78 in/s/s×$10^{-4}$. The effectiveness value is much higher than the norm and the wear rate is unacceptably higher than obtained for undoped parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A carbon/carbon (C/C) composite having internal and external surfaces, comprising crystalline silicon carbide which is essentially uniformly distributed on both the internal and external surfaces of the composite in a low concentration.

2. The C/C composite according to claim 1, wherein the silicon carbide is in a concentration range of 0.001 to 1.00 weight percent based upon the total weight of the composite.

3. The C/C composite according to claim 1, wherein the composite has a wear rate in the range of 0.01 to 0.13 inch/s/s×$10^{-4}$, and a friction coefficient in the range of 0.27 to 0.4.

4. The C/C composite according to claim 2, wherein the silicon carbide is in a concentration range of 0.01 to 0.5 weight percent based upon the total weight of the composite.

5. The C/C composite according to claim 3, wherein the composite has a wear rate in the range of 0.03 to 0.12 inch/s/s×$10^{-4}$, and a friction coefficient in the range of 0.28 to 0.395.

6. The C/C composite according to claim 1, wherein the SiC in the composite is at least 90 wt % crystalline.

7. The C/C composite according to claim 1, wherein the SiC in the composite is about 100 wt % crystalline.

8. A process for preparing a carbon/carbon (C/C) composite comprising crystalline silicon carbide which is essentially uniformly distributed on both internal and external surfaces of the composite in a low concentration, said process comprising:

infiltrating a C/C composite preform with a solution of a preceramic compound composed of silicon and carbon; and heat treating the C/C composite under conditions sufficient to convert the preceramic compound to silicon carbide.

9. The process according to claim 8, wherein-the silicon carbide is in a concentration range of 0.001 to 1.00 weight percent based upon the total weight of the composite.

10. The process according to claim 8, wherein the preceramic compound is a polymer selected from the group consisting of polycarbosilane, organopolysilazane, polycarbosiloxane, and mixtures thereof.

11. The process according to claim 10, wherein the polymer is crosslinked with a crosslinking promoter which is selected from the group consisting of dibenzoyl peroxide, bis-p-chlorobenzoyl peroxide, bis-2,-dichlorobenzoyl peroxide, di-t-butyl peroxide, dicumyl peroxide, t-butyl perbenzoate, 2,5-bis(t-butylperoxy)-2,3-dimethylhexane and t-butyl peracetate.

12. The process according to claim 10, wherein the polymer has reactive silicon centers which are rendered unreactive by adding a crosslinking agent.

13. The process according to claim 12, wherein the crosslinking agent is a diisocyanate.

14. The process according to claim 13, wherein the polymer is a poly(methyl-vinyl)silazane, the crosslinking agent is 1,6-diisocyanate and the crosslinking promoter is dicumyl peroxide.

15. The process according to claim 8, wherein the concentration of the preceramic compound in the solution is 0.05–10 weight percent.

16. The process according to claim 8, wherein the preceramic compound is an alkyl orthosilicate.

17. The process according to claim 16, further comprising a step of crosslinking the alkyl orthosilicate with a concentrated solution of a strong acid.

18. The process according to claim 8, wherein the SiC in the composite is at least 90 wt % crystalline.

19. The process according to claim 8, wherein the SiC in the composite is about 100 wt % crystalline.

20. A carbon/carbon (C/C) composite comprising crystalline silicon carbide which is essentially uniformly distributed on both internal and external surfaces of the composite in a low concentration, wherein the composite is prepared by a process comprising, infiltrating a C/C composite preform with a solution of a preceramic compound composed of silicon and carbon; and heat treating the C/C composite under conditions sufficient to convert the preceramic compound to silicon carbide.

* * * * *